under Patent Office  3,266,410
Patented August 16, 1966

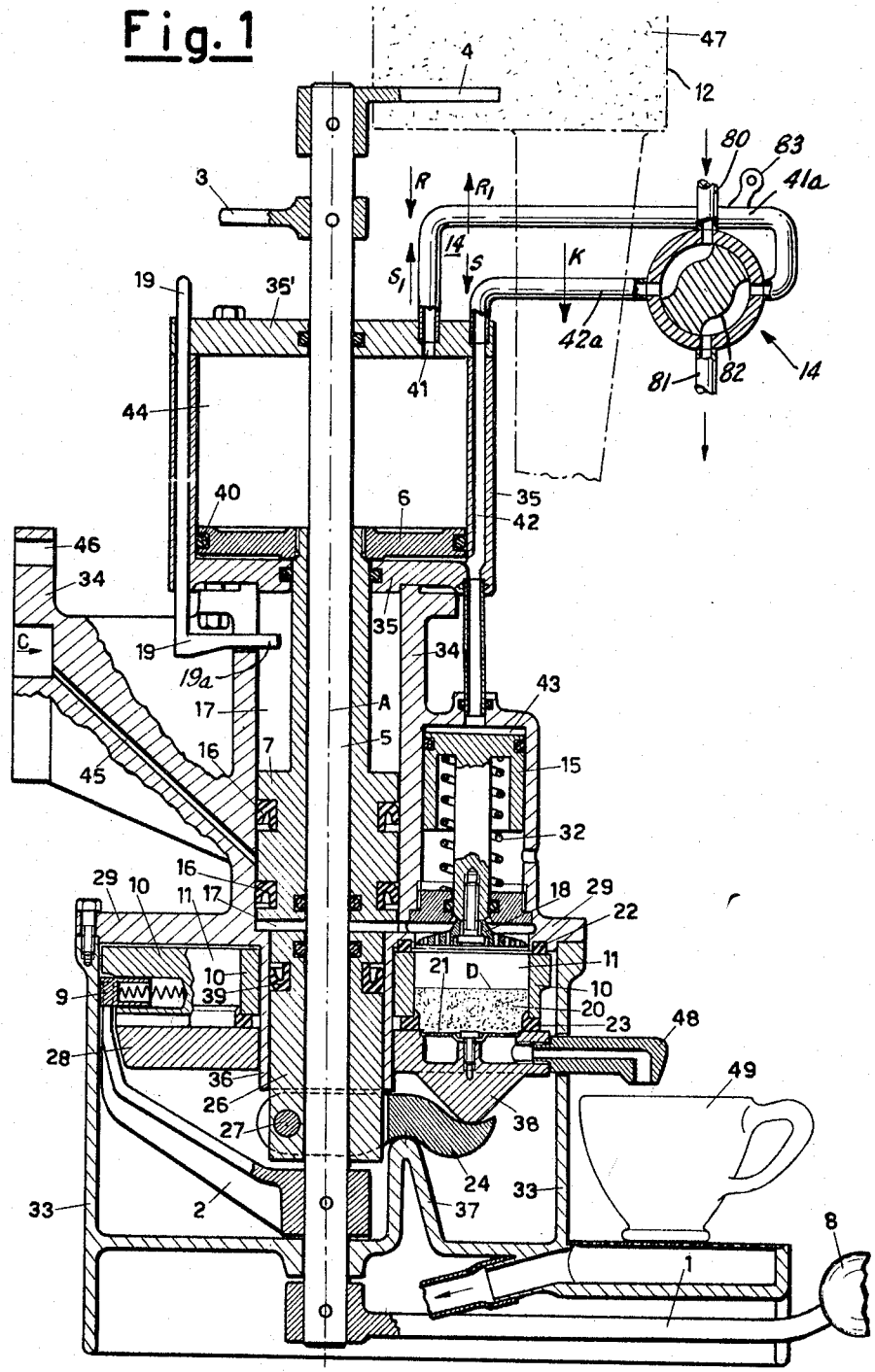

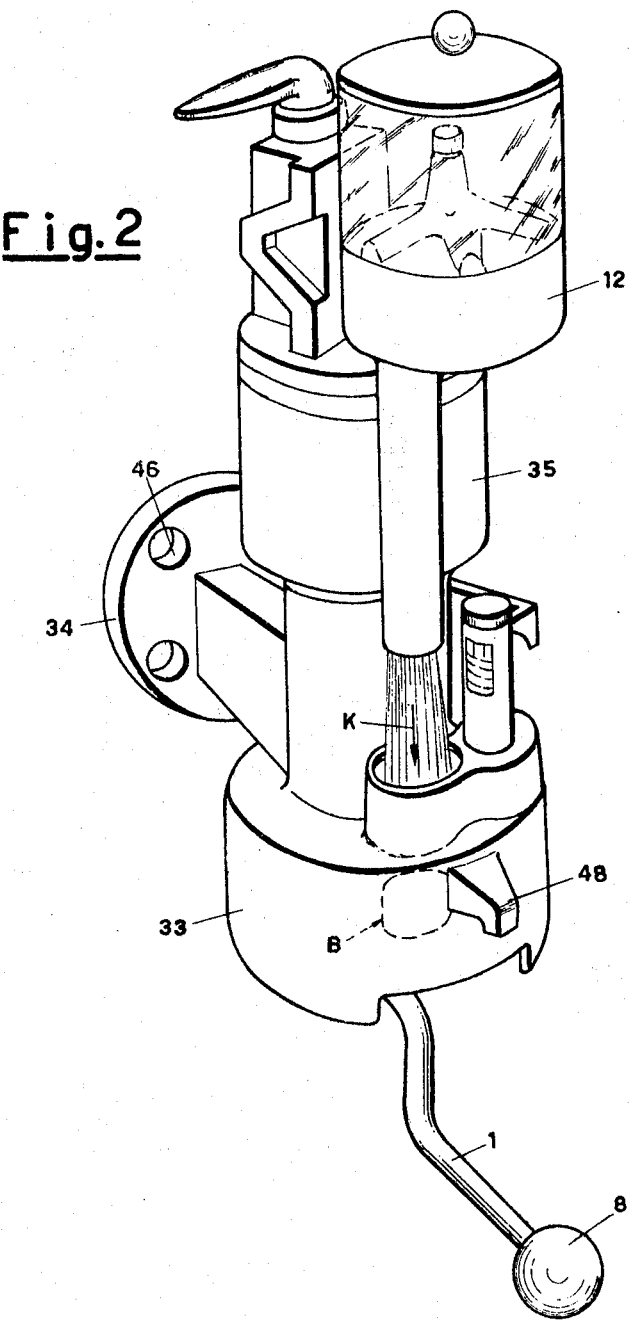

3,266,410
MACHINE FOR PREPARING COFFEE INFUSION
Andrea Ivo Novi and Modesto Pratolongo, Milan, Italy, assignors to Organizzazione Novi S.r.l., Milan, Italy
Filed Aug. 30, 1963, Ser. No. 305,676
Claims priority, application Italy, Sept. 1, 1962, 17,436/62
5 Claims. (Cl. 99—287)

This invention relates to an automatic machine for preparing the so-called "espresso" coffee and more particularly a machine having a rotary element, the general form of which is that of a disc, provided with a series of holes traversing said disc entirely and spaced at equal angular distance from each other. Each time that a portion of espresso coffee is to be prepared in this machine, the aforesaid rotary element is rotated to bring one of said holes into a predetermined position in which, while the rotary element remains stationary, a jet of hot water under pressure traverses a portion of powdered coffee which has been placed previously in said hole.

It is an object of the invention to provide means ensuring a fluid-tight seal between the two faces of said element and of the opposing faces of the two walls of the machine between which it is located, said means becoming operative to create and maintain a seal at the instant when the rotary element being stationary water is passed into the aforesaid hole to produce there espresso coffee. It is a further object to provide such means that allow the element to rotate in order to effect the preparation of a further portion of espresso coffee.

Automatically operating coffee machines of the above type are well known in the art. For example, espresso coffee machines comprising an essentially disc-shaped rotary element supported for rotation about a vertical axis and having a plurality of holes evenly arranged thereabout and adapted for intermittent rotation for successively indexing each one of said holes in a plurality of loading, beverage forming and ground coffee exhausting locations have heretofore been utilized.

Such known machines are in general connected with a source of hot water for providing the beverage as the water is forcibly caused to percolate through a layer of ground coffee previously provided in the hole indexed in the beverage forming location, and with a ground coffee dispenser so designed that a metered quantity of ground coffee is discharged, each time the dispenser is actuated, through a feed chute located above the loading location. Such dispensing devices, well known to those skilled in the art to which this invention appertains, are actuated upon manual or mechanical actuation of an actuating lever thereof.

Therefore, such general arrangement and operation of espresso coffee machines and of the coffee dispenser devices associated and cooperating therewith will not be further described in detail but reference will be made thereto as may be necessary for a full understanding of the invention and the scope thereof.

In addition, in such known machines, means are provided for causing the exhausted ground coffee to be removed from the holes through which the beverage has been provided. Such means generally include jets of pressurized water or steam directed and phasedly actuated for downwardly pushing away the ground coffee from the individual hole which has been displaced from the beverage forming location to the coffee exhausting location upon rotation of the rotary element, at each step of the operation. Therefore, such coffee exhausting means will not be illustrated and described in detail, as not pertaining to the invention as individually considered and well known in the art. A feature of the machine according to the invention, consists in that the means employed to realize a fluid tight seal between the two faces of the aforesaid rotary element and of the walls between which it is mounted are actuated by fluid pressure at the instant when the hot water is forcibly caused to traverse the powdered coffee located in the hole.

Other objects and advantages of the invention will become apparent as the description of a preferred embodiment of the machine and a modification thereof proceeds with reference to the accompanying drawings, in which:

FIG. 1 is a vertical sectional view of the machine; and
FIG. 2 is a schematic perspective view of the machine.

The machine for preparing espresso coffee comprises a frame or static portion composed of several mutually connected frame parts 33, 34, 35, 35'.

A shaft 5, mounted in the interior of the frame in such a manner that it is capable of rotating about its geometrical axis A which is fixed with respect to the frame and without being capable of sliding parallel to the latter, has pinned thereto levers 1, 2, 3 and 4, which are discussed in detail hereinbelow.

In the interior of a housing constituted by the part 33 is mounted a disc 10, provided with a series of holes 11 (five in number, for example), the axes of which are parallel to the axis of the disc (which coincides with the axis A) and which traverse the disc entirely, said holes constituting as many chambers in which the preparation of the espresso coffee is successively effected. The disc 10 is located between a wall 29 of the part 34 of the frame and a wall 28 fitted around, as is the disc itself, on a tubular extension 36 of this same part 34. The disc 10 can rotate about its axis (coincident with the axis A); the wall portion 28 however, located below, cannot rotate and has only a slight play in the direction of said axis. Packings 22 and 23 are provided between the disc 10 and the wall portions 29 and 28, which ensure a fluid-tight seal between the disc and said wall portions when hot water descends through a hole 11 to produce an infusion of coffee, as will be described hereinbelow. In the interior of the tubular extension 36 a piston 26 is axially slidable, a tight seal with the tubular extension being ensured by a packing 39. A small lever 24 is pivoted by a pivot 27 to the piston 26. An upstanding portion 37 of the part 33 of the frame acts as a fulcrum to lever 24, which can push upwards against a boss 38 on the wall 28.

In a chamber 44, comprised within the interior of part 35, a piston 6 is slideably mounted and sealed by means of a packing 40, said piston 6 being intergral with a piston 7, of smaller diameter, slideably mounted in a chamber 17 comprised within the part 34 and sealed by means of a packing 16. The aforesaid pistons are traversed by the shaft 5, in relation to which they can move axially. In the same part 34 is provided a cylindrical chamber 43 in which a piston 15 may slide, said piston being rotatably connected to a pusher foot 18; a spring 32 urges the piston 15, and, consequently, said pusher foot, into the raised position. The part 35 mounts a rod 19, which has a vertical stem portion slidable lengthwise in the wall portion of part 35 and a lower offset portion 19a so positioned that as piston 7 approaches its uppermost position said piston engages and urges the offset portion 19a and rod 19 upwardly. A conventionally constructed and operating distributing valve, diagrammatically shown in FIG. 1 and generally indicated at 14, has ports communicating via ducts 41a and 42a with an opening 41 in the upper portion of cylinder 44 (above piston 6) and respectively with a passage 42 having outlets both in the upper portion of cylinder 43 (above piston 15) and in the lower portion of the same cylinder 44 (below piston 6). In addition, such valve 14 is connected such as at 80 to a supply of pressurized water (not shown) and to an exhaust duct such as at 81. The valve has a valve component such as at 82, conventionally designed so that pressurized water can be alternatively fed below piston 6 and above piston 15, and respectively above piston 6, and exhausted from said cylinders 44 and 43, for allowing return stroke of said pistons. By means of conventionally arranged link means, the valve component 82 of valve 14 is operated upon action of lever 3, rotatively connected to shaft 5, and reversed as the rod 19 is urged upwardly by piston 7.

The above described valve and control means therefor are not critical and characteristic of the invention, as any different means may be provided according to the art of espresso coffee machines of the character considered, for reversing the supplying and exhausting of pressurized water within cylinders, the reversing steps being alternatively caused upon operator control, such as rotation of shaft 5 connected to lever 1 and handle 8, and respectively as a two-stroke piston such as piston 6 has completed its upward stroke, so that as said shaft 5 is manually rotated the water will be caused to circulate as indicated by arrows S and $S_1$ while, as pistons 6 and 7 attain their uppermost position, reversing of valve 14 will reverse water circulation as indicated by arrows R $R_1$.

A boiler (not shown) communicates with chamber 17 through a conduit 45. The machine for preparing espresso coffee hereinbefore described can be fixed to a support by means of screws or similar elements traversing the apertures 46 provided for this purpose in the part 34.

It will be now explained the manner of functioning of the machine, which is actuated by an operator who moves the lever 1. By manipulating the knob 8 of lever 1, the operator causes the lever 1 to pivot in the desired direction (from right to left) along its full course, which is of angular amplitude corresponding to the even angular spacing of the holes 11 in the rotary disc 10, assuming that, as above, said disc is provided with five evenly spaced holes, said full course (limited by abutments, not shown) is of one-fifth of a full revolution. During said rotation the following steps take place: with relation to disc 10 such movement is idle, that is, such disc remains stationary. Lever 2, however, correspondingly rotated, will engage with one of a plurality of spring urged pawls 9, provided about said disc 10, designed to operate with said lever 2 to act as a ratchet gear means for causing said disc to be rotated during the return rotation of shaft 5 only. The rotation of shaft 5, connected to lever 1, causes lever 4 to rotate and actuate in a known manner a conventional ground coffee dispensing device, generally indicated at 12, which causes a metered amount of ground coffee to be dispensed from a coffee supply 47 and to fall, through a suitable hopper, into the hole 11 which is actually indexed in the loading position (not shown). This same rotation further causes lever 3, through a suitable linkage to actuate the valve 14, as said lever 1 is successively swung back by the operator to its starting position.

As said swinging back of lever 1 is performed, the following further actions and steps occur and the full operative cycle of the machine is complete without further action on the part of the operator.

Lever 2 being engaged with pawl 9 causes rotation of disc 10 so that the hole 11, wherein the metered amount of ground coffee has been fed to form a layer 20 therein, is carried in its beverage forming location shown in the right portion of FIG. 1, beneath a perforated presser foot 18 connected to a piston 15 in a cylinder 43, coaxial to said presser foot and to said hole 11 in said location, and above a perforated diaphragm 21 designed to operate as a filter or screen through which the liquid beverage may pass toward a spout 48, as is conventional in the art. Such filter 21 is carried by a canalized boss 38 having an upper annular face adapted for abutment from below on an annular packing 23 provided at the lower contour of each hole 11 in disc 10.

In addition, the return rotation of shaft 5 causes lever 3 to operate valve 14 so that pressurized water is fed via ducts 80, 42a and 42 below piston 6 in the cylinder chamber 44 and above piston 15 in the cylinder chamber 43.

The pressure of the water acting on the lower face of piston 6 causes the latter to rise in the chamber 44; this pressure also causes piston 15 to descend, which compresses the coffee powder in the chamber 11, now occupying said position D. After rising a predetermined amount the piston 7 uncovers the orifice of conduit 45 and allows the latter to communicate with chamber 17, so that hot water supplied from a suitable conventional boiler (not shown) connected to a duct 45 flows below piston 7 and, through the perforated presser foot 18 floods and impregnates the layer 20 of coffee, while said layer is still pressed by foot 18. Due to the relatively low pressure of hot water (supplied at a temperature low enough so as not to spoil the flavor of the beverage) and the consistency of the pressed coffee, such water may advantageously wet the ground coffee but cannot noticeably percolate therethrough.

On continuing its ascending movement the piston 7 actuates, at another predetermined point, the rod 19 which is pushed upwards, at its lower portion 19a, by the upwardly moving piston 7, reverses the said valve 14 and therefore causes a reversal of the circuit of the water coming from the conduit via the valve 14: at said point, the water is admitted into the chamber 44, in the direction of the arrow R, pushing downwards on the upper face of piston 6. This causes the pistons 6 and 7 to begin a descending movement; moreover, since water can now leave by the conduit 42 (in the direction of the arrow $R_1$), piston 15, urged upwards by spring 32, rises and causes the expulsion of the water from said conduit.

According to an ancillary feature of the invention, said piston 15 and pusher foot 18 are urged upwardly by a return spring 32 loaded to slightly overcome the weight of such components. Therefore, as exhaustion of water from below piston 6 causes a certain counter-pressure to be built up in passage 42 and cylinder chamber 43, uprising of said presser foot 18 will be delayed nearly until the full downward stroke of pistons 6 and 7 is completed. Such feature leads to the fact that during percolation of the beverage (provided by high pressurization of water by descending piston 7) the ground coffee of layer 20, while being not noticeably pressed, is maintained in place by said presser foot.

Chamber 17 is thus filled with hot water, being under a pressure greatly superior to that of the water entering the machine via the tap 14, owing to the difference between the diameters of pistons 6 and 7. The value of this pressure depends however on the resistance constituted by the infused cake of coffee powder 20 (compressed coffee) located on the filter 21. Said hot-water pressure, in the course of the descent of the piston 7, pushes the piston 26 downwards, thus exerting on lever 24 a force which tends to pivot the latter in the direction in which its end in contact with the boss 38 of the wall 28 rises: the wall 28, thus urged upwards, moves slightly to compress the packings 22 and 23.

These packings 22, 23, made preferably of a material such as polytetrafluoroethylene or the like, and being thus compressed, efficiently ensure the fluid tight seal between the part 29 and the disc 10 and between the latter and the wall 28, respectively. Thus, the pressure of the hot water itself, while descending to produce the espresso coffee, is exploited to ensure that the necessary fluid-tight seal is obtained. It will be noted in particular that since the arm of lever 24 which is in contact with the boss 38 is shorter than that arm of the same lever which is pivotably mounted on the piston 26, the force which urges the wall 28 to obtain the fluid-tight seal is considerable; at any rate, this force is substantially greater than the force which would tend to detach the disc 10 from the fixed upper wall 29.

In the light of the above disclosure the particular advantage constituted by the fact that it is the same agent (the pressure of the hot water) which would tend to provoke leakages between the disc 10 and the wall portions 28 and 29 which ensures that the necessary fluid-tight seal is obtained will be recognized. In this respect, it will be noted in particular that the force compressing said packings increases proportionally with increasing pressure (i.e. the force which would tend to start leaks).

On traversing the compressed layer of coffee 20, the water forms the espresso coffee which exists through the filter 21 and a spout 48 to pass into a cup 49 placed below. When the piston 6 arrives at the end of its downward course, the hot water ceases to be under pressure, which also annuls both the tendency of the water to escape between the disc 10 and the walls 28, 29 and the action of lever 24 on the wall 28, and the preparation of the espresso coffe is completed. To prepare another portion of espresso coffee, the above described movements will be repeated. In particular, when, as stated above, the lever 1, by the intermediary of lever 3 and valve 14, causes the water to enter the conduit 42 (in the direction of arrow S) and allows the water to leave the chamber 44 (arrow $S_1$), the piston 6 itself expels the water from this chamber in the course of its ascent. The water which is expelled in the direction of the arrows $S_1$ and $R_1$ is caused to traverse the chamber 11 containing the exhausted coffee powder (which remains of the powder after the formation of the espresso coffee) and this chamber communicates with an evacuating means.

It will be obvious to those skilled in the art that various changes may be made in the invention without departing from the spirit and scope thereof and therefore the invention is not limited by that which is shown in the drawings and described in the specification, but only as indicated in the appended claims.

We claim:

1. In a machine for preparing espresso coffee upon percolation of pressurized hot water through a layer of ground coffee meteredly located into holes paraxially provided into a discoidal rotary element arranged for intermittent rotation into a space defined by opposed frame walls and transistorily positioned at a beverage forming location below a perforated presser foot and above a coffee screening perforated filter supported by a movable portion of said walls, a source of reciprocating motion, a piston reciprocable into a cylinder chamber and drivingly connected to said source, hot water supply duct means having an outlet in said chamber and located to be uncovered by said piston as said piston is retreated by said source, a passage between said chamber and upstream of said presser foot whereby hot water is forcibly percolated through said coffee layer through said presser foot and said filter as said piston is forwarded by said source, a second piston reciprocable into a second chamber in fluid communication with said cylinder chamber, and means connecting said second piston to said movable portion of said walls to displace said wall portion towards said rotary element to transitorily provide a fluid-tight seal between said rotary element and said walls as said hot water is pressurized for percolation thereof through said layer.

2. The machine of claim 1, wherein said source of reciprocating motion consists of a two-stroke cylinder mechanism connected to a source of a relatively low pressure fluid for reciprocation thereof, the cylinder of said mechanism being of cross-sectional area greater than the cross-sectional area of said cylinder chamber, and wherein the piston of said mechanism is coaxial with and secured to said hot water pressurizing piston to pressurize said hot water for percolation thereof at a pressure greater than the pressure applied for reciprocating said mechanism and pistons.

3. The machine of claim 2, wherein said presser foot is connected to a presser foot operating piston reciprocable in a chamber connected to said source of relatively low pressure fluid, and means to apply in said chamber said low pressurized fluid concurrently with the return stroke of said hot water pressurizing piston for pressing said ground coffee layer prior to percolation of hot water therethrough.

4. The machine of claim 1, wherein said piston is located in the axis of rotation of said rotary element, said second piston is coaxial with said piston, and wherein a two-armed lever has opposite end portions in abutting relationship with said second piston and said movable portion of said walls.

5. The machine of claim 3, wherein said presser foot operating piston has a return spring urgingly connected thereto, said spring being loaded to cause return of said foot in the absence of counter-pressure caused by exhaustion of said relatively low pressurized fluid from said chamber.

References Cited by the Examiner

UNITED STATES PATENTS

| 1,390,008 | 9/1921 | Arduino | 99—289 X |
| 3,019,719 | 2/1962 | Parraga | 99—287 |
| 3,143,058 | 8/1964 | Jannin | 99—289 X |
| 3,143,955 | 8/1964 | Rockwell | 99—289 |

FOREIGN PATENTS

| 789,525 | 8/1935 | France. |
| 1,184,141 | 2/1959 | France. |
| 934,152 | 8/1963 | Great Britain. |
| 496,595 | 7/1954 | Italy. |
| 506,258 | 12/1954 | Italy |
| 509,543 | 1/1955 | Italy. |
| 515,285 | 2/1955 | Italy. |
| 520,753 | 3/1955 | Italy. |
| 566,811 | 9/1957 | Italy. |

WALTER A. SCHEEL, *Primary Examiner.*

STANLEY FISHER, *Assistant Examiner.*